United States Patent
Amizic et al.

(10) Patent No.: US 8,315,345 B2
(45) Date of Patent: *Nov. 20, 2012

(54) CLOSED LOOP POWER NORMALIZED TIMING RECOVERY FOR 8 VSB MODULATED SIGNALS

(75) Inventors: Bruno Amizic, Chicago, IL (US); Tyler Brown, Mundelein, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,977

(22) Filed: Nov. 1, 2010

(65) Prior Publication Data

US 2011/0044381 A1    Feb. 24, 2011

Related U.S. Application Data

(62) Division of application No. 11/258,700, filed on Oct. 26, 2005.

(51) Int. Cl.
*H04L 7/00* (2006.01)

(52) U.S. Cl. ........ 375/355; 375/224; 375/345; 375/267; 375/295; 375/148; 455/101; 455/455; 455/423; 455/69

(58) Field of Classification Search ............... 375/224, 375/345, 355, 261, 295; 455/423, 101, 455, 455/69
See application file for complete search history.

(56) References Cited

U.S. PATENT DOCUMENTS

| | | |
|---|---|---|
| 4,344,176 A | 8/1982 | Qureshi |
| 5,454,015 A | 9/1995 | Olafsson |
| 5,455,847 A | 10/1995 | Guilford et al. |
| 5,806,038 A | 9/1998 | Huang et al. |
| 5,881,098 A | 3/1999 | Tzou |
| 5,978,759 A | 11/1999 | Tsushima et al. |
| 5,991,336 A | 11/1999 | Scholtz et al. |
| 6,067,319 A | 5/2000 | Copeland |
| 6,381,291 B1 | 4/2002 | Yom |
| 6,449,244 B1 | 9/2002 | Loseke |
| 6,614,490 B2 | 9/2003 | Hong et al. |
| 6,785,349 B1 | 8/2004 | Rosenlof et al. |
| 6,980,609 B1 * | 12/2005 | Ahn ........................ 375/343 |
| 6,986,080 B2 | 1/2006 | Kim et al. |
| 7,072,425 B2 | 7/2006 | Jun et al. |
| 7,095,805 B2 | 8/2006 | Jun |
| 7,113,559 B2 | 9/2006 | Baas et al. |
| 7,221,715 B2 | 5/2007 | Ahn |
| 7,263,142 B2 | 8/2007 | Kim et al. |
| 2003/0026369 A1 | 2/2003 | Murray et al. |

(Continued)

OTHER PUBLICATIONS

M.D. Zoltowski et al., "Closed-Form 2D Angle Estimation With Rectangular Arrays Via DFT Beamspace ESPRIT", Signals, Systems and Computers, 1995, pp. 682-687.

(Continued)

*Primary Examiner* — Eva Puente

(57) ABSTRACT

A timing recovery loop includes a sampler, a narrow band filter, an RMS normalize, a timing error detector, and a sample controller. The sampler samples a received signal. The narrow band filter filters the sampled received signal so as to pass an upper band edge of the received signal and not a lower band edge of the received signal. The RMS normalize sets an average power level of an output of the filter to a substantially constant value. The timing error detector detects a timing error with respect to an output of the RMS normalize. The sample controller controls the sampler in response to the detected timing error.

6 Claims, 6 Drawing Sheets

U.S. PATENT DOCUMENTS

| | | | |
|---|---|---|---|
| 2003/0194024 | A1 | 10/2003 | Edde |
| 2003/0221142 | A1 | 11/2003 | Kim et al. |
| 2004/0067039 | A1 | 4/2004 | Jun |
| 2004/0145681 | A1 | 7/2004 | Jun |
| 2004/0227856 | A1 | 11/2004 | Cooper |
| 2005/0069048 | A1 | 3/2005 | Jun et al. |
| 2005/0141660 | A1 | 6/2005 | Kim |
| 2006/0045210 | A1 | 3/2006 | Lee |
| 2006/0094384 | A1 | 5/2006 | Rouphael |
| 2006/0274851 | A1 | 12/2006 | Park et al. |
| 2007/0088515 | A1 | 4/2007 | Kim |

OTHER PUBLICATIONS

Miyake et al., "A New Timing Extraction Method and Data Interpolation for Block Demodulation", Speech Processing 2, Digital Signal Processing, International Conference on Acoustics, May 23, 1989, pp. 1223-1226.

Moon et al., "Timing Recovery in CMOS using Nonlinear Spectral-line Method", IEEE May 5, 1996, Custom Integrated Circuits Conference, pp. 13-16.

M.D. Zoltowski et al., "Closed-Form 2D Angle Estimation With Rectangular Arrays in Element Space or Beamspace via Unitary ESPRIT", IEEE Transactions on Signal Processing, vol. 44, No. 2, Feb. 1996, pp. 316-328.

Gini et al., "Frequency Offset and Symbol Timing Recovery in Flat-Fading Channels: A Cyclostationary Approach", IEEE Transactions on Communications, vol. 46, No. 3, Mar. 1998, pp. 400-411.

Gardner, "Signal Interception: A Unifying Theoretical Framework for Feature Detection", IEEE Transactions on Communications, vol. 36, No. 8, Aug. 1988, pp. 897-906.

Gardner, "A BPSK/QPSK Timing-Error Detector for Sampled Receivers", IEEE Transactions on Communications, vol. Com-34, No. 5, May 1986, pp. 423-429.

Houcke et al., "Joint Blind Equalization and Estimation of the Symbol Period: A Contrast Function Approach", in ICASSP 2001, pp. 2545-2548.

Koblents et al., "Asynchronous Timing Recovery in DSP Based PSK Modems", in ASILOMAR, Oct. 2-28, 1992, vol. 2, pp. 632-641.

A. Papoulis, "Probability, Random Variables and Stochastic Processes", 3rd Edition, 1991, ISBN 0-07-048477-5, p. 395.

* cited by examiner

CLOSED LOOP POWER NORMALIZED TIMING RECOVERY FOR 8 VSB MODULATED SIGNALS

RELATED APPLICATIONS

The present application is a divisional of U.S. patent application Ser. No. 11/258,700 filed on Oct. 26, 2005. The present application relates to subject matter similar to the subject matter disclosed in application Ser. No. 10/278,350 filed on Oct. 23, 2002 and to the subject matter disclosed in application Ser. No. 11/258,735 filed on Oct. 26, 2005.

TECHNICAL FIELD OF THE INVENTION

The present invention relates to timing recovery in digital receivers.

BACKGROUND OF THE INVENTION

Timing recovery is an important digital receiver function in which the frequency and phase of the receiver's sampling clock are adjusted in order to minimize inter-symbol interference as well as to compensate for possible sampling frequency drifts between the transmitter and receiver's sampling clocks. Sampling the received signal at the optimum sampling instant is important for detection purposes. By sampling the received waveform at the optimum sampling instants, a smaller probability of error in the detection stage is obtained. However, if there is a mismatch between the transmitter and receiver's clocks, the received signal will be sampled at the wrong times, which will increase the level of sampling noise (also known as timing jitter) as well as introduce sampling frequency drifts. Minimizing timing jitter and preventing sampling frequency drifts are two important timing recovery objectives.

A simple, non-data aided, widely used timing recovery algorithm for band-limited amplitude modulated data streams is known as the Gardner technique and is shown in FIGS. 1 and 2. FIG. 1 illustrates how a Gardner timing error detector 10 can be incorporated into the timing recovery architecture.

As shown in FIG. 1, a signal on an input 12 is sampled by a sampler 14 and the sampled signal is provided to the Gardner timing error detector 10. The Gardner timing error detector 10 detects a timing error based on three successive samples and provides the detected timing error to a loop filter 16. The output of the loop filter 16 controls a numerically controlled oscillator (NCO) 18 which adjusts the timing of the sampler 14 in accordance with the output of the loop filter 16.

The Gardner timing error detector 10 was originally designed for BPSK/QPSK receivers, but it can be shown that the Gardner timing error detector works successfully for higher order constellations.

The Gardner timing error detector 10 typically uses two samples per symbol for its operation and is based on the transmitted pulse shape symmetry. As shown in FIG. 2, the input to the Gardner timing error detector 10 is provided to an input of a first one sample delay 20 and to a positive input of a summer 22. The output of the first one sample delay 20 is provided to an input of a second one sample delay 24 and to one input of a multiplier 26. The output of the second one sample delay 24 is provided to a negative input of the summer 22, and the output of the summer 22 is provided to the other input of the multiplier 26.

The Gardner timing error detector 10 works well for a flat or clean channel with the assumption of a white Gaussian noise environment. However, the Gardner timing error detector 10 is sensitive to nulls in the spectrum of the received pulse. In particular, when a null exists at half the transmitted symbol rate, the accuracy of the timing indications produced by the Gardner timing error detector 10 is reduced.

The spectrum of the received pulse, which is the product of the spectrum of the transmitted pulse and the spectrum of the channel, will have a null at a particular frequency when the spectrum of the channel has a null at that frequency. Nulls in the channel spectrum can occur when the transmitted signal travels through multiple paths between the transmitter and the receiver. In this phenomenon, known as multi-path propagation, certain frequency components of the signals arriving at the receiver will add destructively (interfere) resulting in nulls in the spectrum at those frequencies. Multi-path propagation is typically present when, in addition to a direct path between the transmitter and the receiver, additional paths are present due to reflections of the transmitted signal off of objects such as buildings, terrain, and moving objects.

Therefore, a need exists for a timing recovery algorithm that operates well in the presence of multi-path propagation. The present invention relates to improved timing recovery for multi-path reception. The Gardner timing error detector 10 performs poorly or does not perform at all for such channel conditions. Since successful timing recovery is important for accurate data detection, it is important that timing recovery is performed successfully and that the timing recovery process be substantially independent of the current channel conditions.

SUMMARY OF THE INVENTION

According to one aspect of the present invention, a method of detecting a receiver timing error with respect to a received signal comprises the following: filtering the received signal with a narrow band filter so as to pass an upper band edge of the received signal and not a lower band edge of the received signal and so as to produce a first output signal; setting an average power level of the first output signal to a substantially constant value so as to produce a second output signal; and, determining the timing error based on the second output signal.

According to another aspect of the present invention, a timing recovery loop comprises a sampler, a filter, a power level controller, a timing error detector, and a sample controller. The sampler samples a received signal. The filter filters the sampled received signal, and the filter has a narrow passband arranged to pass an upper band edge of the received signal and not a lower band edge of the received signal. The power level controller sets an average power level of an output of the filter to a substantially constant value. The timing error detector detects a timing error with respect to an output of the power level controller. The sample controller controls the sampler in response to the detected timing error.

According to still another aspect of the present invention, a method is provided to detect a receiver timing error in a timing recovery loop based on a received signal. The received signal comprises received symbols associated with a symbol rate. The method comprises the following: filtering out channel distortions in the received signal except for spectral nulls at half the symbol rate; increasing a power level of the filtered received signal to a value sufficient to permit timing recovery for all channel conditions including channel conditions producing the spectral nulls; and, determining the timing error based on the filtered received signal having the increased power level.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
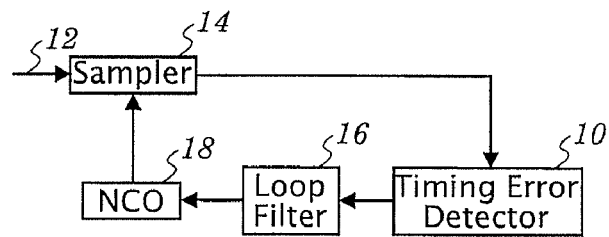
FIG. 1 illustrates a standard timing recovery loop utilizing a Gardner timing error detector.
Figure 2:
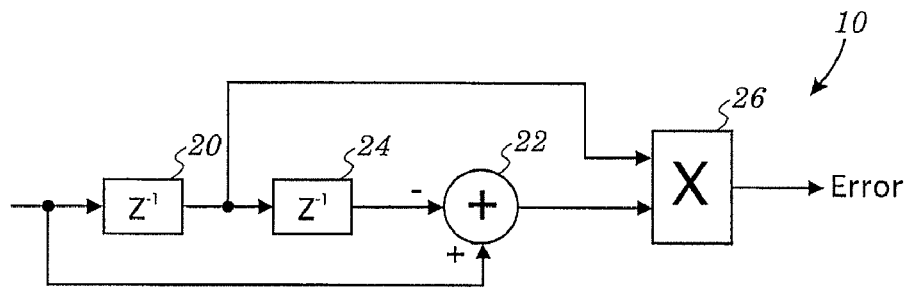
FIG. 2 shows in more detail the Gardner timing error detector of FIG. 1.
Figure 3:
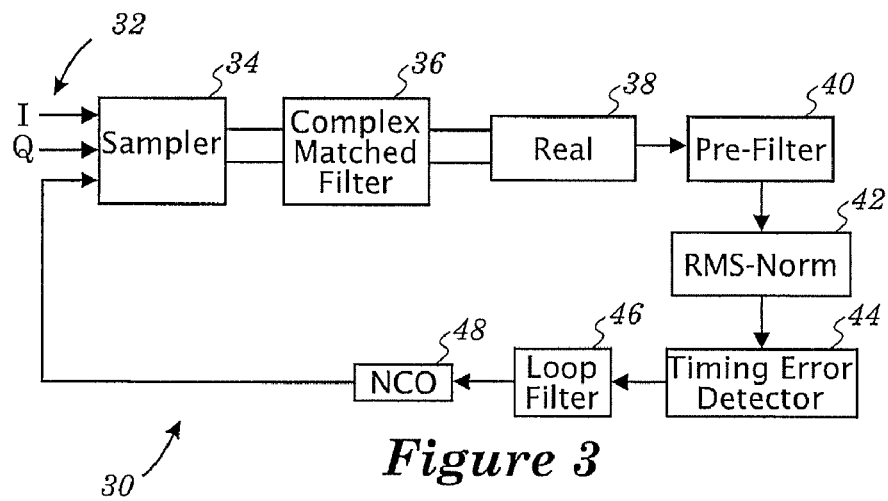
FIG. 3 illustrates a timing recovery loop in accordance with an embodiment of the present invention.

An 8-VSB timing recovery apparatus 30 shown in FIG. 3 receives a signal on an input 32. The received signal is sampled by a sampler 34, and the sampled signal is filtered by a complex matched filter 36. The real part of the filtered signal is taken at 38 and is supplied to a pre-filter 40. The pre-filter 40 is a narrow band filter arranged to pass the upper band edge of the received and match filtered signal and not the lower band edge of the received and match filtered signal. The width of the passband of the pre-filter 40 may be, for example, approximately 50 kHz and the center of the passband may be, for example, 5.381 MHz. The received and match filtered signal for a standard 6 MHz channel has the spectrum shown in FIG. 8. The output of the pre-filter 40 is normalized by an RMS normalizer 42. The RMS normalizer 42 sets the average power level of the output of the pre-filter 40 to a constant value.

Figure 12:
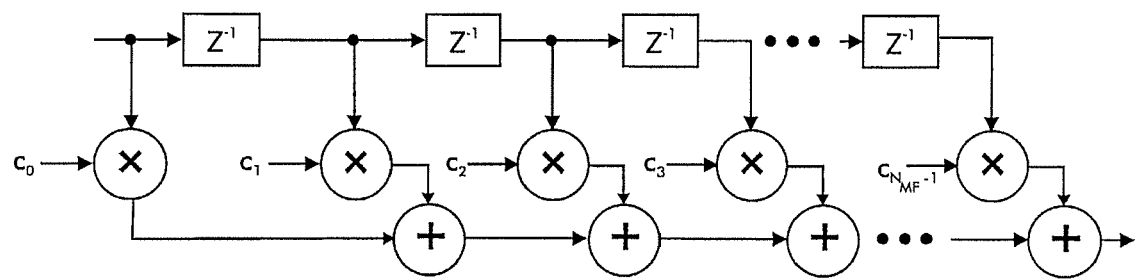
FIG. 12 illustrates an example of a matched filter that can be used for the complex matched filter of FIG. 3; and, FIG. 13 illustrates an example of a pre-filter that can be used for the pre-filter of FIG. 3.

An example of a matched filter that can be used for the complex matched filter 36 is shown in FIG. 12. The input of the matched filter shown in FIG. 12 is the input to the first $Z^{-1}$ delay element, and the output of the matched filter shown in FIG. 12 is the last summer. The inputs $C_0$ etc. are for the tap weights of the complex matched filter.

Figure 13:
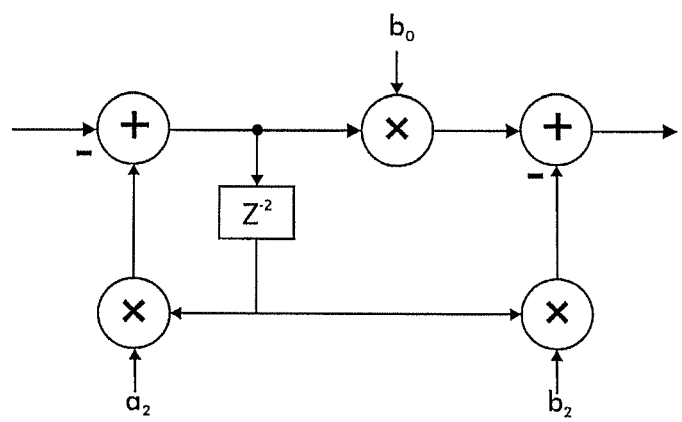

An example of a pre-filter that can be used for the pre-filter 40 is shown in FIG. 13. The input of the pre-filter shown in FIG. 13 is the input to the first summer, and the output of the pre-filter shown in FIG. 13 is the last summer. The inputs $b_0$, $a_2$, and $b_2$ are constants that define the band width and center for the pre-filter.

The output of the RMS normalizer 42 is provided to a timing error detector 44. The timing error detector 44 detects a timing error between the transmitter and receiver clocks and provides the detected timing error to a loop filter 46. The output of the loop filter 46 controls a numerically controlled oscillator 48 which adjusts the timing of the sampler 34 in accordance with the output of the loop filter 46.

Figure 4:
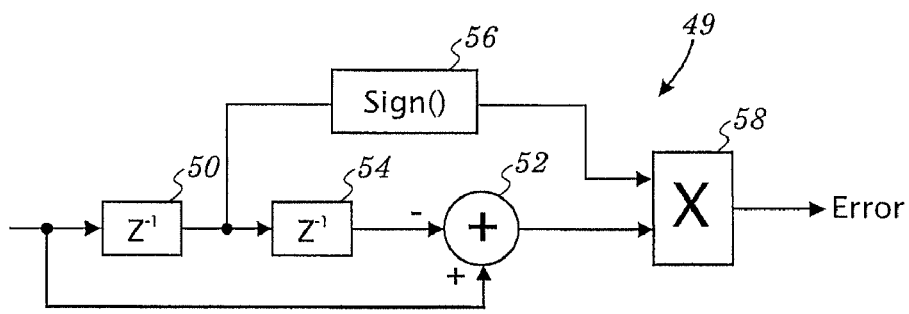
FIG. 4 illustrates another timing error detector that can be used in the timing recovery loop of FIG. 3.

A timing error detector 49 shown in FIG. 4 is an example of a timing error detector that may be used for the timing error detector 44 of FIG. 3. The timing error detector 49 is a modification of the timing error detector 10. The input to the timing error detector 49 is provided to an input of a first one sample delay 50 and to a positive input of a summer 52. The output of the first one sample delay 50 is provided to an input of a second one sample delay 54 and to a sign extractor 56. The output of the second one sample delay 54 is provided to a negative input of the summer 52, and the output of the summer 52 is provided to one input of a multiplier 58. An output of the sign extractor 56 is provided to the other input of the multiplier 58. The sign extractor 56 provides a +1 or a −1 to the multiplier 58 depending upon whether the output of the first one sample delay 50 is positive or negative, respectively.

Figure 5:
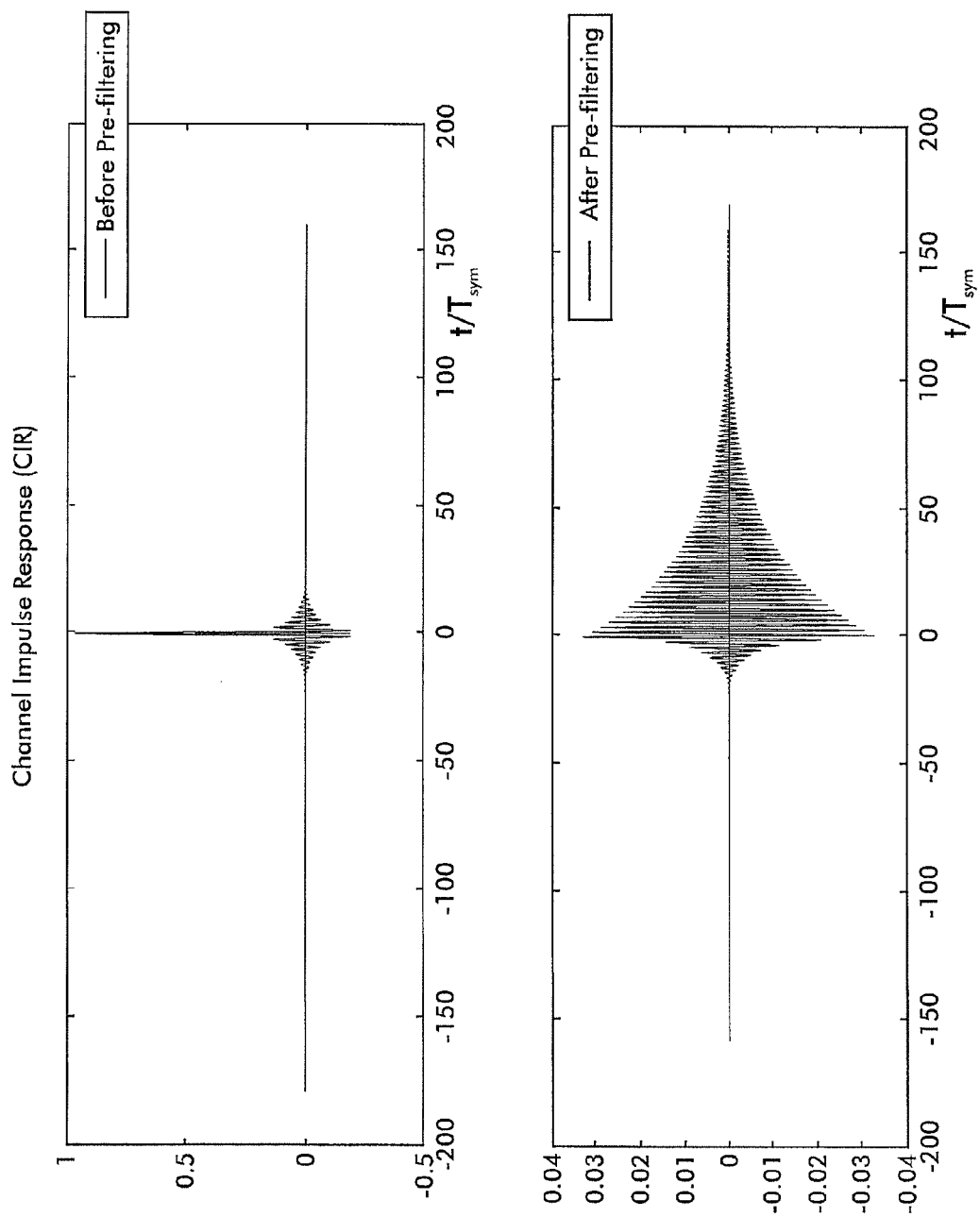
FIG. 5 illustrates examples of a signal input to and output from the pre-filter of FIG. 3.

The advantage of the timing error detector 44 over Gardner timing error detectors used in a standard Gardner timing recovery loop is higher self-gain for channel conditions in which the standard Gardner timing recovery loop does not work. As shown in FIG. 5, as a result of the pre-filtering performed by the pre-filter 40 on the signal supplied to the timing error detector 44, a new timing pulse is obtained due to the convolution between the transmitted pulse and the impulse response of the narrow band pre-filter 40. The newly obtained timing pulse is very robust to multi-path channel conditions because most channel distortions are filtered out.

Now, the only channel conditions for which timing recovery will fail are the channel conditions producing spectral nulls at half the symbol rate. For such channel conditions, the timing error detector's S-curve has a very low amplitude. Therefore, the loop gain of the timing recovery loop should be increased. With this increased loop gain, timing recovery can be successfully performed for all channel conditions at high SNR, including channel conditions producing spectral nulls at half the symbol rate. However, if care is not exercised, a high loop gain will result is more timing jitter for the majority of channel conditions. In order to prevent unnecessary timing jitter, the loop gain is preset by the RMS normalizer 42 such that successful timing recovery can be performed for the pre-defined lowest power signal at the input to timing error detector 44.

Figure 6:
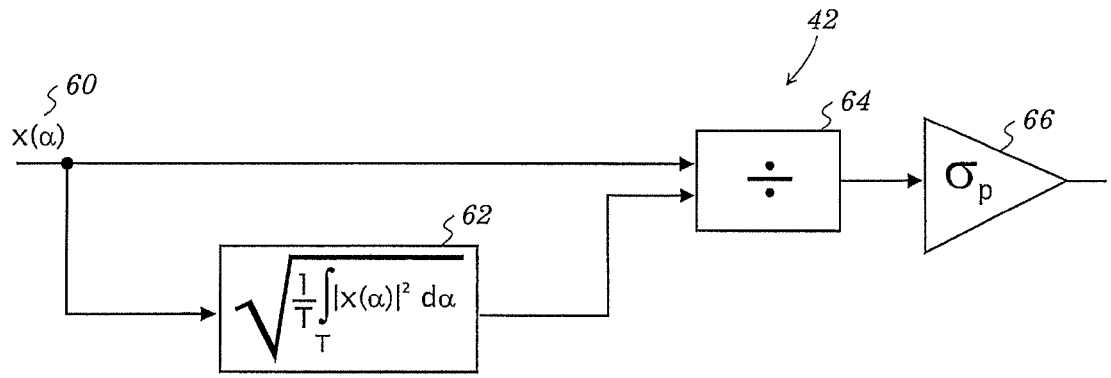
FIG. 6 illustrates an embodiment of the RMS normalizer of FIG. 3.

The RMS normalizer 42 is shown in more detail in FIG. 6. The RMS normalizer 42 has an input 60 that receives the output of the pre-filter 40. The input to the RMS normalizer 42 is provided to an integrator 62 and to one input of a divider 64. The output of the integrator 62 is provided to the other input of the divider 64. The divider divides the input signal at the input 60 by the output of the integrator 62. The division result is provided to an input of a gain element 66, and the output of the gain element 66 is provided to the input of the timing error detector 44. As shown in the drawing, the gain of the gain element is $\sigma_P$.

Figure 7:
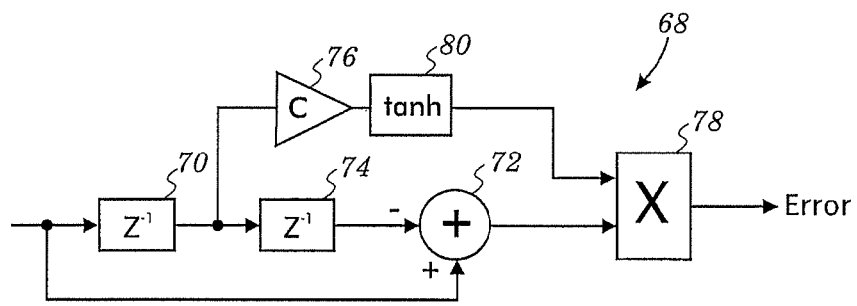
FIG. 7 illustrates still another timing error detector that can be used in the timing recovery loop of FIG. 3.

A timing error detector 68 shown in FIG. 7 is another example of a timing error detector that may be used for the timing error detector 44 of FIG. 3. The timing error detector 68 is another modification of the timing error detector 10. The input to the timing error detector 68 is provided to an input of a first one sample delay 70 and to a positive input of a summer 72. The output of the first one sample delay 70 is provided to an input of a second one sample delay 74 and to an input of a gain element 76. The output of the second one sample delay 74 is provided to a negative input of the summer 72, and the output of the summer 72 is provided to one input of a multiplier 78. The gain element 76 applies a constant gain C to the output of the first one sample delay 70. A hyperbolic tangent function 80 determines the hyperbolic tangent of the output of the gain element 76 and provides this the hyperbolic tangent to the other input of the multiplier 78.

Figure 8:
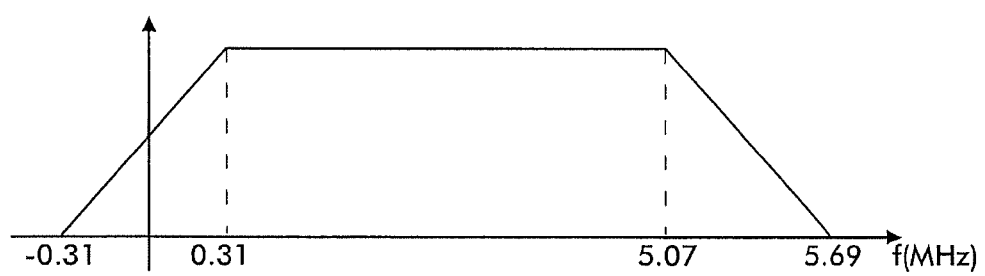
FIG. 8 illustrates the power spectrum for 8 VSB data modulation.

The timing recovery of the present invention is applicable to any linear digital modulation techniques. However, the present invention as particularly disclosed herein is applied to the 8 VSB data modulation scheme, which is currently being used for terrestrial high definition digital television transmissions. The power spectrum for 8 VSB data modulation is shown in FIG. 8.

Figure 10A:
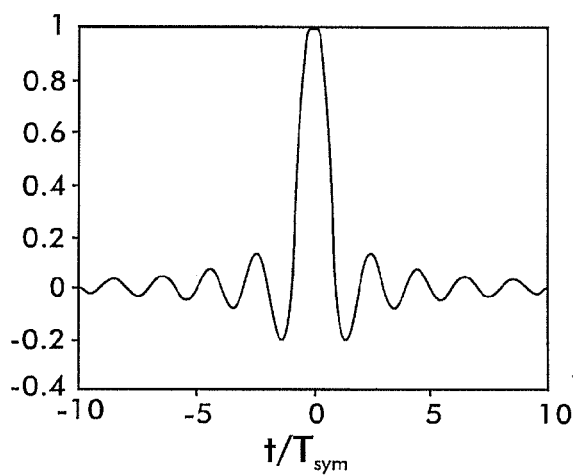
FIG. 10 is a plot of the complex pulse shape used for generation of an 8 VSB signal.
Figure 10B:
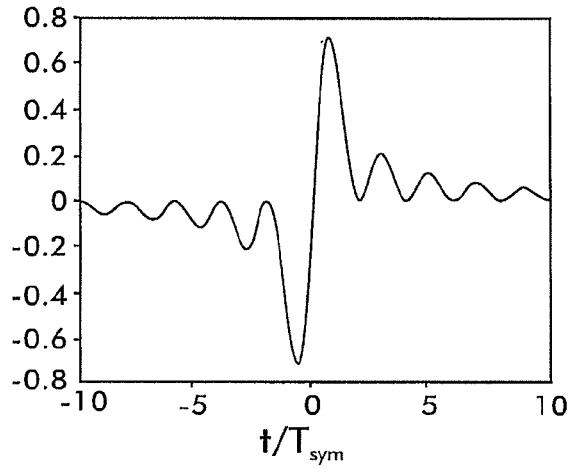

The 8 VSB signal is a linear modulated 8-ary PAM signal with real-valued symbols s[k] and a complex pulse shape q(t). A plot of the complex pulse shape used for generation of the 8 VSB signal is shown in FIG. 10. The real-valued symbols s[k] are uniformly distributed and are independent random variables with symbol levels {−7, −5, −3, −1, 1, 3, 5, 7}. The transmitted base-band signal r(t) may be expressed by the following equation:

$$r(t) = \sum_k s[k]q(t - \tau - kT_{sym}) + w(t) \tag{1}$$

where w(t) is white Gaussian noise, $\tau$ is the sampling offset (timing error), and $T_{sym}$ is the symbol period.

As shown in FIG. 3, the first operation performed in timing recovery is the matched filtering performed by complex matched filter 36. The output of the complex matched filter 36 is denoted y(t) and is given by the following equation:

$$y(t) = \int_{-\infty}^{+\infty} r(\lambda) q^*(\lambda - t) d\lambda \tag{2}$$

Combining equations (1) and (2) produces the following equation:

$$y(t) = \sum_k s[k] p(t - \tau - kT_{sym}) + w(t) * q^*(-t) \tag{3}$$

where p(t) is the complex raised cosine pulse obtained by convolving the transmitted pulse shape q(t) with the matched filter impulse response q*(−t), and where the superscript * represents the complex conjugate.

The Gardner timing error detector requires symmetry of the pulse shape used for symbol modulation. Since the 8 VSB timing pulse shape p(t) is complex, the symmetry can be obtained by taking the real part of y(t) at 38 as the timing error detector input for estimation of the sampling offset $\tau$. Accordingly, the real part of y(t) is given by the following equation:

$$y_R(t) = \sum_k s[k] p_R(t - \tau - kT_{sym}) + \text{Re}\{w(t) * q^*(-t)\} \tag{4}$$

where $p_R(t)$ is the real part of the complex raised cosine pulse p(t). The Gardner timing error detector is defined according to the following equation:

$$e[n] = y_R\left[\left(n - \frac{1}{2}\right)T_{sym}\right]\{y_R[(n-1)T_{sym}] - y_R[nT_{sym}]\} \tag{5}$$

By combining equations (4) and (5), it can be shown that the expected value (S-curve) of the Gardner timing error detector is defined according to the following equation:

$$E\{e[n]\} = E\left\{\sum_k s[k] p_R\left[\begin{array}{c}\left(n - \frac{1}{2}\right)T_{sym} + \tau_{est}(n-1) - \\ \tau - kT_{sym}\end{array}\right]\right\} -$$

$$E\left\{\sum_m s[m] p_R\left[\begin{array}{c}(n-1)T_{sym} + \tau_{est}(n-1) - \\ \tau - mT_{sym}\end{array}\right]\right\} \tag{6}$$

$$E\left\{\sum_k s[k] p_R\left[\begin{array}{c}\left(n - \frac{1}{2}\right)T_{sym} + \tau_{est}(n-1) - \\ \tau - kT_{sym}\end{array}\right]\right.$$

$$\left.\sum_m s[m] p_R\left[\begin{array}{c}nT_{sym} + \tau_{est}(n) - \\ \tau - mT_{sym}\end{array}\right]\right\}$$

The actual timing recovery loop equation has the form given by the following equation:

$$\tau_{est}[n+1] = \tau_{est}[n] + \gamma e[n] \tag{7}$$

where $\gamma$ is the loop gain.

The timing offset estimate is updated every $T_{sym}$ seconds. The Gardner timing error detector requires two samples per symbol. Defining the symbol energy as $E\{s[k]^2\} = \sigma^2$ and using the fact that symbols are identically independently distributed, equation (5) becomes the following equation:

$$S(\delta) = \sigma^2 \sum_i p_R\left[\left(i - \frac{1}{2}\right)T_{sym} - \delta\right] p_R[(i-1)T_{sym} - \delta] - $$

$$\sigma^2 \sum_i p_R\left[\left(i - \frac{1}{2}\right)T_{sym} - \delta\right] p_R[iT_{sym} - \delta] \tag{8}$$

where $\delta = \tau - \tau_{est}$ assuming that steady state exists such that $\tau_{est}(n-1) = \tau_{est}(n) = \tau_{est}$. As used herein, $\tau$ is the true timing error and $\tau_{EST}$ is the estimated timing error.

Equation (8) can be further simplified to the following equation:

$$S(\delta) = \frac{4\sigma^2 K}{T_{sym}} \sin\left(\frac{2\pi\delta}{T_{sym}}\right) \tag{9}$$

where K is a constant given by the following equation:

$$K = \int_{-\infty}^{+\infty} p_R\left(\frac{1}{2T_{sym}} - f\right) p_R\left(\frac{1}{2T_{sym}} + f\right) \cos(\pi f T_{sym}) df \tag{10}$$

Figure 9:
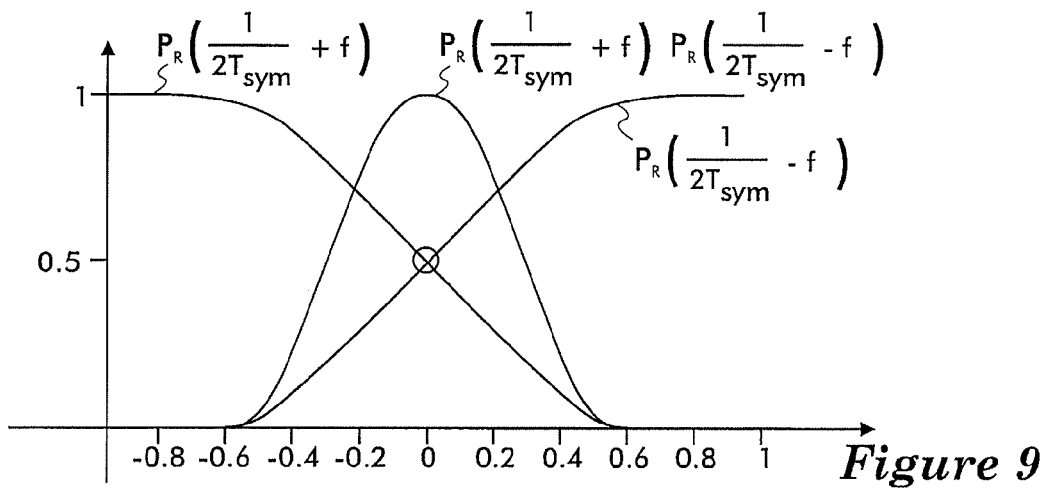
FIG. 9 is a graph useful in explaining the S-curve of the timing error detector of FIG. 3.
Figure 11:
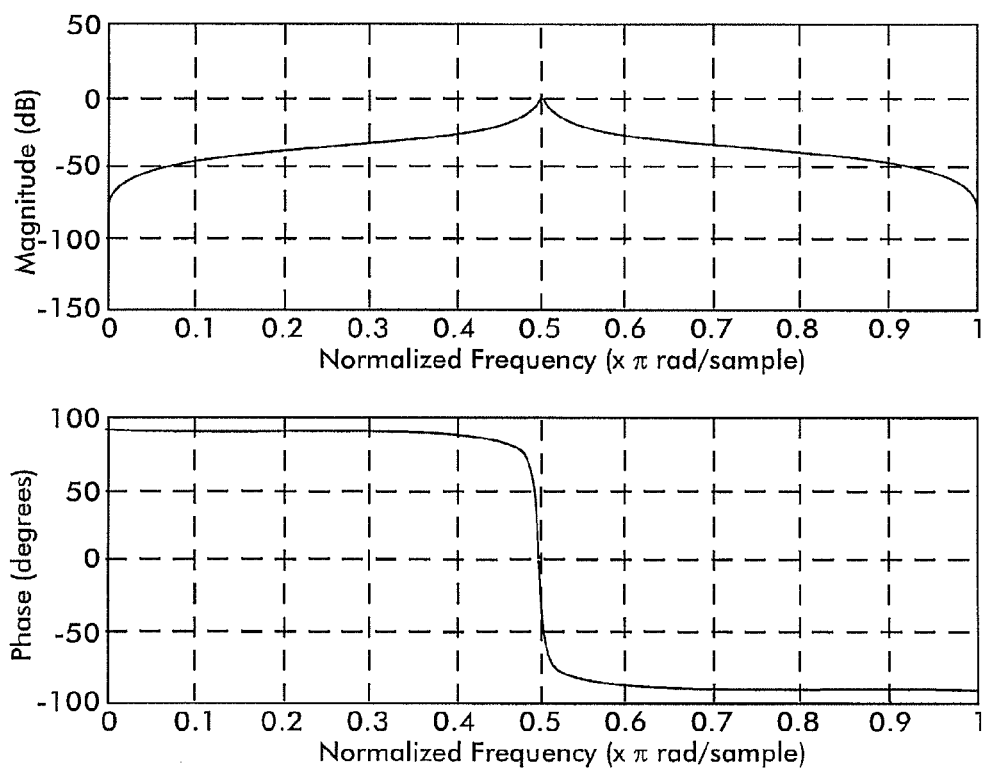
FIG. 11 shows the frequency response of the pre-filter of FIG. 3.

It can be seen that the S-curve shown in equation (9) is sinusoidal, has a period $T_{sym}$, and passes through the origin at $\delta = 0$. The amplitude of the S-curve is proportional to K, which depends on the roll-off factor used in 8 VSB modulation and the impulse response of the channel. As K decreases, the amplitude of the S-curve becomes smaller and, therefore, is inadequate for the tracking operation. As can be seen from FIG. 9, K depends only on the upper band edge of the 8 VSB complex power spectrum shown in FIG. 8. This dependency is the reason why the Gardner timing error detector has difficulties with the family of channels that have spectral nulls around half of the symbol rate. By using the pre-filter 40 to pre-filter the signal upstream of the timing error detector 44, information that is not needed for successful timing recovery is discarded because the constant K as shown in Equation (10) does not depend on this discarded information. The frequency response of the pre-filter 40 is shown in FIG. 11.

Use of the power (root mean square, RMS) normalization provided by the RMS normalizer 42 eliminates the need for an unnecessarily high loop gain. After the pre-filter 40, the loop gain becomes channel dependent because loop gain is a function of both the signal power as well as the channel condition. Because of the RMS normalizer 42, the signal power at the output of the pre-filter 40 is held constant. By doing so, the loop bandwidth is set to a constant value independently of current channel conditions.

The RMS normalizer 42 normalizes the power of the input signal to the minimum possible value that will cause the timing error detector 44 to perform successful timing recovery. This minimum possible power is determined by the weakest power signal to be detected. For the case of 8 VSB data modulation, the weakest power signal occurs when there is a spectral null at half the symbol rate. As already mentioned, channels in 8 VSB terrestrial systems produce nulls at half the symbol rate which makes synchronization most difficult. The loop gain becomes very small and a timing error detector 44 that has high self gain for such channel conditions is preferred.

Thus, the timing error detector 44 as shown in FIG. 4 produces a timing error e[n] according to the following equation:

$$e[n] = \text{sgn}\left\{p_R\left[\left(n - \frac{1}{2}\right)T_{sym}\right]\right\}\{p_R[(n-1)T_{sym}] - p_R[nT_{sym}]\} \quad (11)$$

The merit of this modification is that the S-curve of the timing error detector 44 for clean channel conditions is approximately the same as for the standard Gardner timing error detector, yet its self-gain for the null channel conditions is higher than for the standard Gardner timing error detector. In order for the timing error detector 44 of FIG. 4 to perform successful timing recovery, it is preferable that the timing error detector 44 is preceded by a power normalization function and pre-filtering such as described herein. Pre-filtering assures robust multi-path performance, and power normalization controls sampling phase noise. The timing error detector presented in equation (11) works well when there is high signal to noise ratio at the upper band edge of the 8 VSB power spectrum.

In order to further reduce timing jitter at arbitrary signal to noise ratios, the timing error detector 68 can be provided in accordance with the following equation:

$$e[n] = \tanh\left\{Cp_R\left[\left(n - \frac{1}{2}\right)T_{sym}\right]\right\}\{p_R[(n-1)T_{sym}] - p_R[nT_{sym}]\} \quad (12)$$

where C is a constant inversely proportional to the noise power spectral density. The constant C can be pre-set to the worst expected noise power spectral density, or it can be calculated and changed adaptively while performing timing recovery. It can be observed that equation (11) for high signal to noise ratios approaches equation (12).

Certain modifications of the present invention have been discussed above. Other modifications of the present invention will occur to those practicing in the art of the present invention.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claimed:

1. A method of detecting a receiver timing error with respect to a received signal, comprising the steps of:
    filtering the received signal with a narrow band filter so as to pass an upper band edge of the received signal and so as to discard a lower band edge of the received signal and so as to produce a first output signal;
    setting an average power level of the first output signal to a substantially constant value so as to produce a second output signal; and
    determining the timing error based on the second output signal, the step of determining of the timing error includes the sub-steps of:
        delaying the second output signal to produce a one sample delay signal;
        delaying the one sample delay signal to produce a two sample delay signal;
        determining a difference between the second output signal and the two sample delay signal;
        applying a constant gain to the one sample delay signal to produce a constant gain output signal;
        determining a hyperbolic tangent of the constant gain output signal to produce a hyperbolic tangent output signal; and
        multiplying the difference and the hyperbolic tangent output signal to produce the timing error.

2. The method of claim 1, further comprising the step of:
    adjusting sample times of a sampler in accordance with the timing error.

3. The method of claim 1, further comprising the step of:
    complex matched filtering the received signal upstream of the narrow band filter.

4. A timing recovery loop, comprising:
    a sampler that samples a received signal;
    a filter that filters the sampled received signal, wherein the filter has a narrow passband arranged to pass an upper band edge of the received signal and to discard a lower band edge of the received signal;
    a power level controller that sets an average power level of an output of the filter to a substantially constant value;
    a timing error detector that detects a timing error with respect to an output of the power level controller, the timing error detector including:
        a first one sample delay element having an input and an output, wherein the input of the first one sample delay element is an input of the timing error detector;
        a second one sample delay element having an input and an output, wherein the input of the first one sample delay element is coupled to the output of the first one sample delay element;
        a summer having a positive input, a negative input, and an output, wherein one of the positive input and the negative input is coupled to the input of the first one sample delay element, and wherein the other of the positive input and the negative input is coupled to the output of the second one sample delay element;

a constant gain element having an input receiving the output of the first one sample delay element and having an output;

a hyperbolic tangent element having an input connected to the output of the constant gain element and having an output; and a multiplier having first and second inputs and an output, wherein the first input of the multiplier is coupled to the output of the summer, wherein the second input of the multiplier is coupled to the output of the hyperbolic tangent element, and wherein the output of the multiplier is an output of the timing error detector; and a sample controller that controls the sampler in response to the detected timing error.

5. The timing recovery loop of claim 4, wherein the sample controller comprises a loop filter and a numerical controlled oscillator.

6. The timing recovery loop of claim 4, wherein the narrow passband filter is preceded by a complex matched filter.

* * * * *